United States Patent
Huang et al.

(10) Patent No.: US 9,639,192 B2
(45) Date of Patent: May 2, 2017

(54) MULTI-TOUCH SYSTEM AND METHOD FOR CONTROLLING LIQUID CRYSTAL CAPACITORS TO REDUCE TOUCH SENSING INTERFERENCE

(71) Applicant: ORISE TECHNOLOGY CO., LTD., Hsinchu (TW)

(72) Inventors: Hsin-Mao Huang, Hsinchu (TW); Hsiang-Cheng Yu, Taoyuan County (TW); Shih-Hsin Huang, Taoyuan County (TW)

(73) Assignee: FOCALTECH SYSTEMS CO., LTD., Hsinchu (TW)

( * ) Notice: Subject to any disclaimer, the term of this patent is extended or adjusted under 35 U.S.C. 154(b) by 731 days.

(21) Appl. No.: 14/010,866

(22) Filed: Aug. 27, 2013

(65) Prior Publication Data

US 2014/0098056 A1 Apr. 10, 2014

(30) Foreign Application Priority Data

Oct. 5, 2012 (TW) .............................. 101136827 A (51) Int. Cl.
  *G06F 3/041* (2006.01)
  *G06F 3/044* (2006.01)
  *G09G 3/36* (2006.01)
  *G02F 1/1333* (2006.01)

(52) U.S. Cl.
  CPC ........ *G06F 3/0412* (2013.01); *G02F 1/13338* (2013.01); *G06F 3/044* (2013.01); *G06F 3/0418* (2013.01); *G09G 3/3648* (2013.01); *G06F 2203/04103* (2013.01); *G06F 2203/04104* (2013.01); *G09G 2354/00* (2013.01)

(58) Field of Classification Search
  CPC ........ G06F 3/041; G06F 3/0412; G06F 3/044; G06F 2203/04104; G09G 3/36; G09G 3/3648; G09G 3/3655; G09G 3/3659
  See application file for complete search history.

(56) References Cited

U.S. PATENT DOCUMENTS

| | | | | |
|---|---|---|---|---|
| 2012/0242597 A1* | 9/2012 | Hwang | ................. | G06F 3/0412 345/173 |
| 2013/0342478 A1* | 12/2013 | Bae | ........................ | G06F 3/041 345/173 |

* cited by examiner

Primary Examiner — David Tung
(74) Attorney, Agent, or Firm — Bacon & Thomas, PLLC (57) ABSTRACT

A multi-touch system for controlling liquid crystal capacitors to reduce touch sensing interferences includes K gate driving lines, which are divided into N groups each corresponding to a common voltage conductive line. When a display driving signal is applied to an i-th group of gate driving lines for performing a display driving, the liquid crystal capacitor corresponding to the i-th group is set to a predetermined voltage, where i=1 to N. Finally, a touch driving signal is applied to an i-th common voltage conductive line corresponding to the i-th group for sensing touch points, so as to reduce touch sensing affections caused by noises of the liquid crystal display.

17 Claims, 10 Drawing Sheets

MULTI-TOUCH SYSTEM AND METHOD FOR CONTROLLING LIQUID CRYSTAL CAPACITORS TO REDUCE TOUCH SENSING INTERFERENCE

BACKGROUND OF THE INVENTION

1. Field of the Invention

The present invention relates to the technical field of touch panels and, more particularly, to a multi-touch system and method for controlling liquid crystal capacitors to reduce touch sensing interference.

2. Description of Related Art

Figure 1:
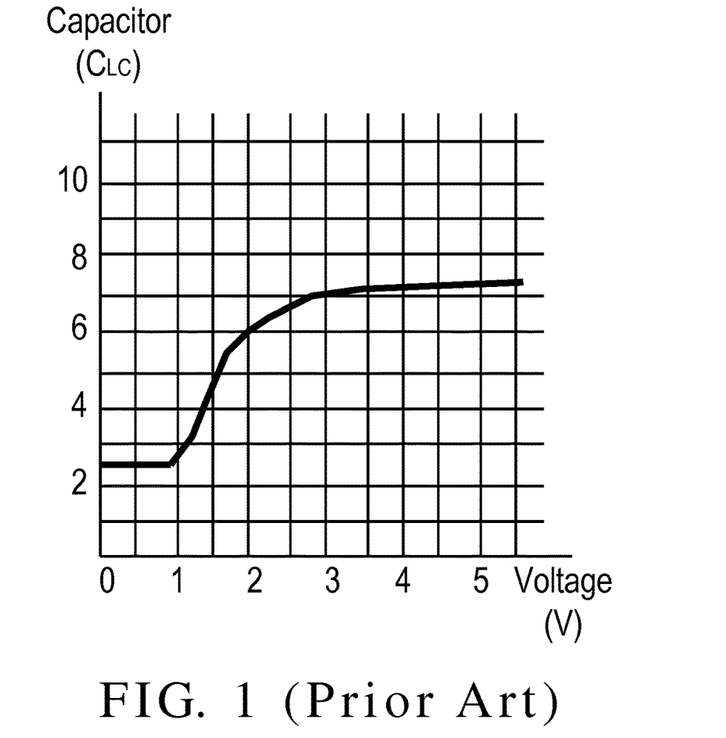
FIG. 1 is a graph of capacitance vs voltage for a liquid crystal capacitor.

Typically, the capacitance changes of liquid crystal capacitors $C_{LC}$ in liquid crystal displays (LCDs) are used to achieve a display on the panels. The change of a liquid crystal capacitor is varied with different voltages to thus have the corresponding values. FIG. 1 is a graph of capacitance $C_{LC}$ vs voltage V for a liquid crystal capacitor. In FIG. 1, the voltage V is changed from zero to 5V. The relationship between capacitance $C_{LC}$ and voltage V is obtained by controlling the voltage V as shown in FIG. 1.

Figure 2:
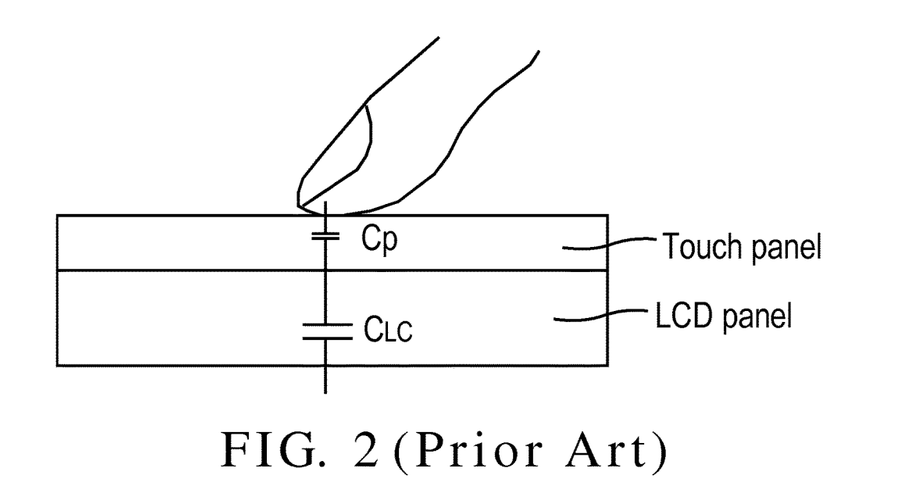
FIG. 2 is a schematic diagram of a typical capacitive touch sensing on an LCD panel.

Accordingly, when the capacitance of the LC capacitor $C_{LC}$ on the LCD panel is changed, a capacitive touch sensing is operated, which is likely to cause a touch sensing mistake. FIG. 2 is a schematic diagram of a typical capacitive touch sensing on an LCD panel, where Cp indicates a finger capacitance. The touch sensing detects a capacitance change between the finger capacitance Cp and the touch panel or LCD panel. In this case, whether an out-cell, on-cell, or in-cell capacitive touch is affected by the liquid crystal capacitor $C_{LC}$ of the LCD panel.

Figure 3:
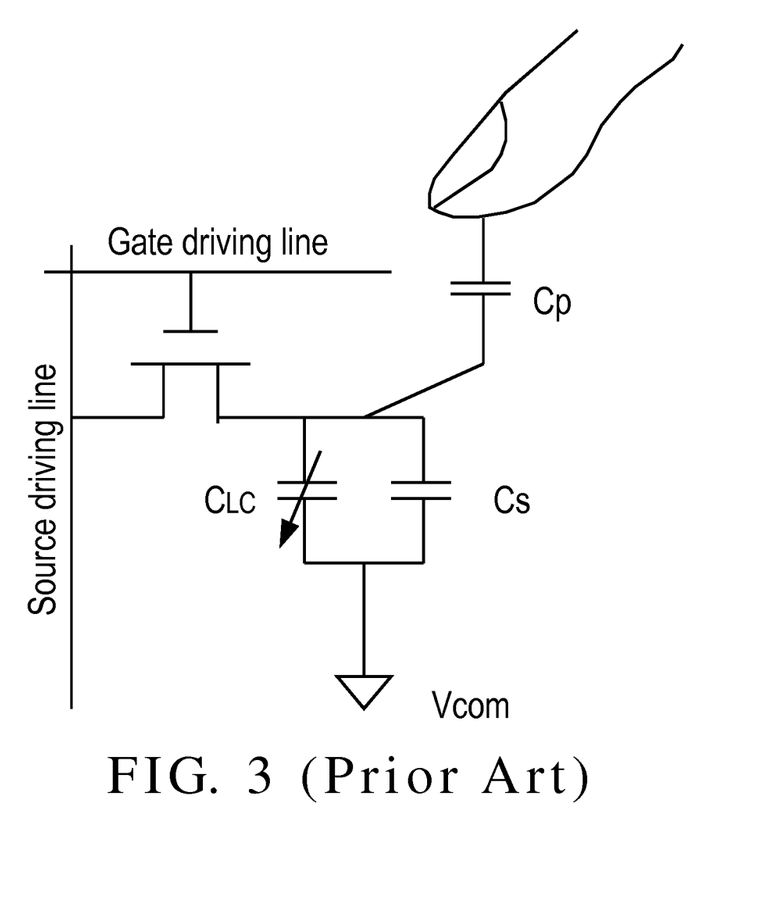
FIG. 3 is a schematic diagram of an in-cell touch sensing of a liquid crystal capacitor.

FIG. 3 is a schematic diagram of an in-cell touch sensing of a liquid crystal capacitor, where Cp indicates a capacitance produced when a finger touches on the LCD panel, and $C_{LC}$ indicates capacitance of the liquid crystal capacitor. Since the pixels are displayed with different values, there are different voltages for the liquid crystal capacitors $C_{LC}$ through the source driving lines. Thus, it is known that capacitance of the liquid crystal capacitor $C_{LC}$ is varied with the pixel values as shown in FIG. 1. Namely, capacitance of the liquid crystal capacitor is not a fixed value. When capacitance of a liquid crystal capacitor is not fixed, it is difficult to perform a capacitive detection because the finger capacitance Cp is connected to the capacitor $C_{LC}$ and change of its capacitance change is small, resulting in that the influence of the capacitor $C_{LC}$ is significant.

Figure 4:
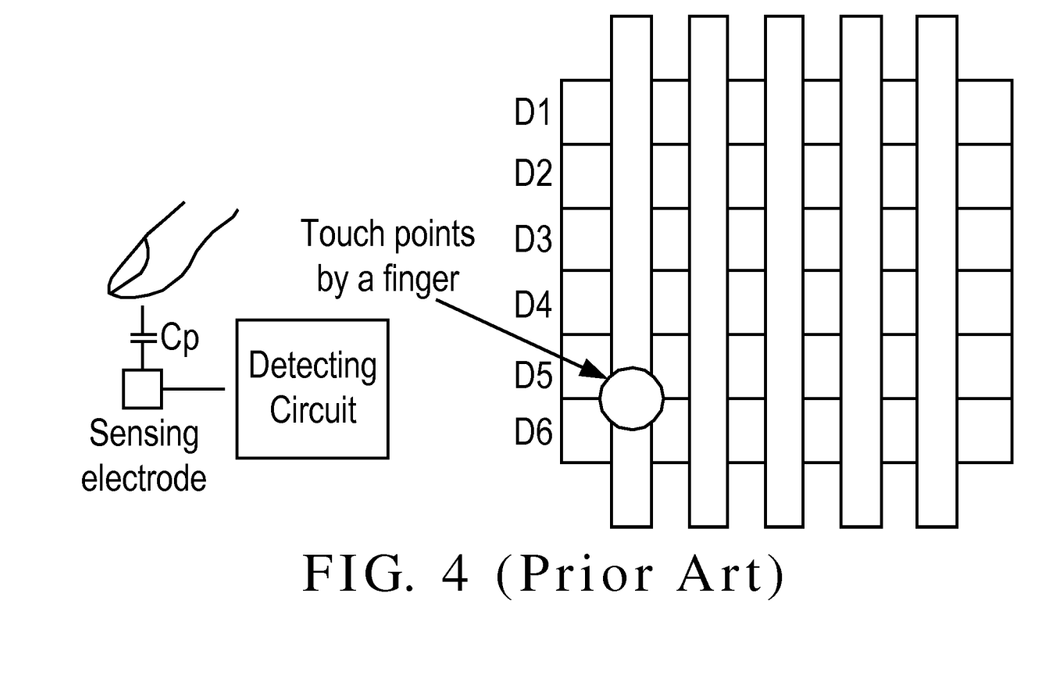
FIG. 4 is a schematic diagram of a typical capacitive touch sensing technology.

However, the capacitive touch sensing technology detects the change of the capacitance Cp to determine whether a finger touches the panel. FIG. 4 is a schematic diagram of a typical capacitive touch sensing technology. In FIG. 4, the capacitance Cp between the finger and the sensing electrode is produced, and the change of the capacitance Cp is detected to obtain the information of the touched position of the finger. Since the change of the capacitance Cp is small, it is sensitive to noises, and a wrong decision may be made. Thus, when the touch panel is mounted on the LCD panel, it is likely to be affected by the noises produced by the LCD panel.

A method is to add an insulating sheet or air gap between the touch panel method to thereby prevent the noises of the display panel from interfering the touch sensing. However, in addition to the increased cost or panel thickness, such a method can be used only in the out-cell touch technology. Moreover, the noise isolation from the display panel is not satisfactory. Another typical method is to boost the driving voltage for increasing the SNR, which may overcome the noises but consume more power.

Figure 5:
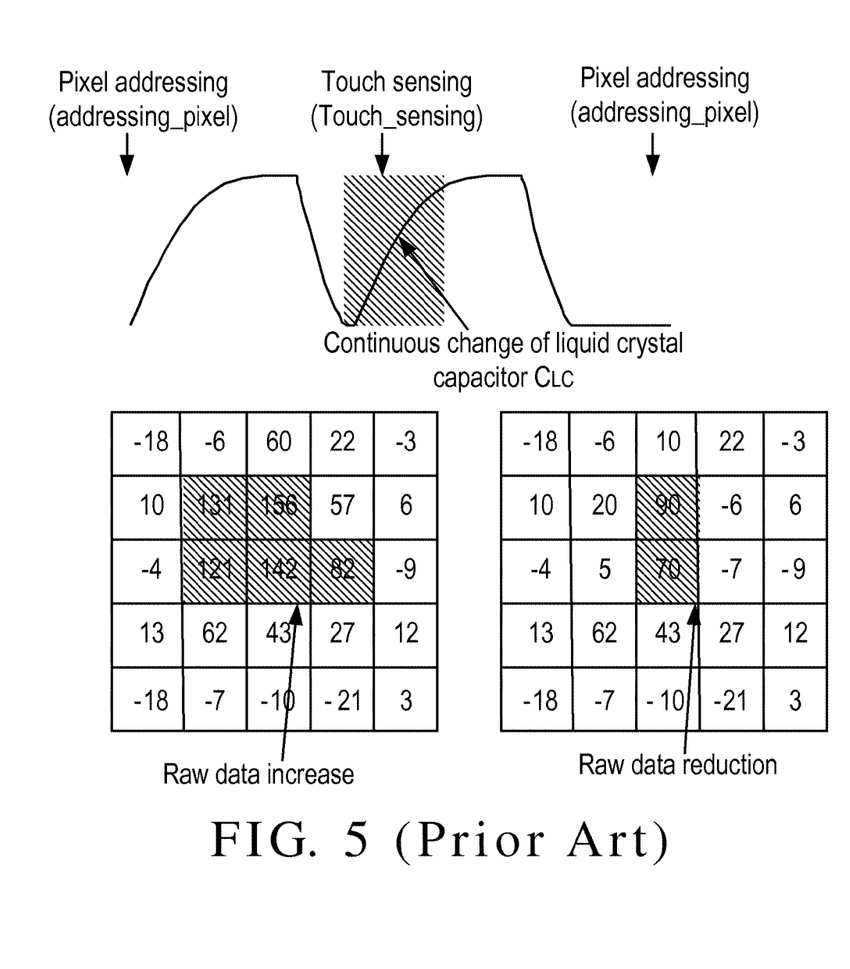
FIG. 5 is a schematic diagram of a typical touch sensing performed when a liquid crystal capacitor is changed.

In the capacitive touch technology, if capacitance of the liquid crystal capacitor $C_{LC}$ is not fixed, sensing a capacitance Cp becomes difficult, and then a wrong decision may occur. As shown in FIG. 5, when the liquid crystal capacitors $C_{LC}$ are changed while a typical touch sensing is performed, it causes a reduction or increase of the raw data extracted on touching, resulting in making a wrong decision and coordinate sway.

Therefore, it is desirable to provide an improved multi-touch system and method for controlling liquid crystal capacitors to reduce touch sensing interference, so as to mitigate and/or obviate the aforementioned problems.

SUMMARY OF THE INVENTION

The object of the present invention is to provide a multi-touch system and method for controlling liquid crystal capacitors to reduce touch sensing interferences, which can reduce the affection of the noises produced by the LCD panel in touch sensing and allow the touch sensing technology to be more steady in a portable application for prolonging the lifetime.

In one aspect of the present invention, there is provided a multi-touch system for controlling liquid crystal capacitors to reduce touch sensing interferences, which includes a touch LCD panel and a touch display control subsystem. The touch LCD panel includes a thin film transistor (TFT) layer, a sensing electrode layer, and a common voltage layer. The TFT layer has K gate driving lines and L source driving lines in order to drive corresponding display transistors and capacitors according to a display pixel signal and a display driving signal for performing a display driving, where K, L are each a positive integer. The sensing electrode layer has M sense conductive lines in order to sense an approaching external object, where M is a positive integer. The common voltage layer has N common voltage conductive lines in order to receive a common voltage on displaying, where N is a positive integer. The touch display control subsystem is connected to the TFT layer and the common voltage layer in order to provide the display driving signal to the K gate driving lines sequentially for activating the corresponding display transistors and to provide the display pixel signal to the L source driving lines for performing a display driving. The touch display control subsystem provides the touch driving signal to the N common voltage conductive lines sequentially and samples sensing voltages of the M sense conductive lines to thereby detect whether the approaching external object exists. The K gate driving lines are divided into N groups. Each group of gate driving lines corresponds to a common voltage conductive line. When the touch display control subsystem provides the display driving signal to an i-th group of gate driving lines, a display driving is performed, and a liquid crystal capacitor corresponding to the i-th group is set to a predetermined voltage, where i=1 to N. Next, the touch display control subsystem provides the touch driving signal to an i-th common voltage conductive line in order to perform a touch sensing by the M sense conductive lines.

In another aspect of the present invention, a method for controlling liquid crystal capacitors to reduce touch sensing interferences in a multi-touch system is provided. The multi-touch system has K gate driving lines, which are divided into N groups each corresponding to a common voltage conductive line. The method includes the steps of: (A) providing a display driving signal to an i-th group of gate driving lines for performing a display driving, where i=1 to N; (B) setting an liquid crystal capacitor corresponding to the i-th group to a predetermined voltage; and (C) providing a touch driving signal to an i-th common voltage conductive line corresponding to the i-th group for performing a touch sensing.

Other objects, advantages, and novel features of the invention will become more apparent from the following detailed description when taken in conjunction with the accompanying drawings.

DETAILED DESCRIPTION OF THE PREFERRED EMBODIMENT

Figure 6:
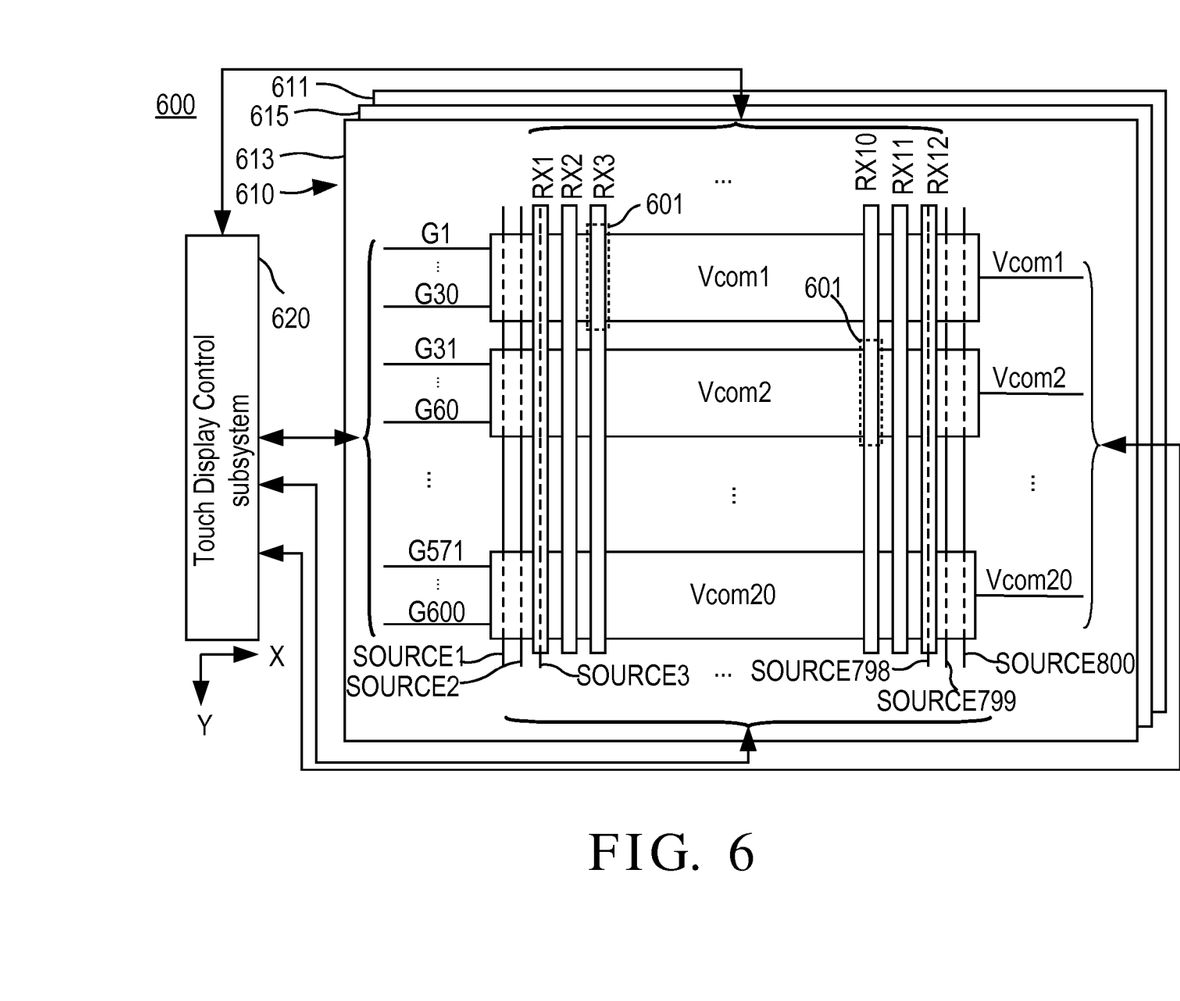
FIG. 6 is a schematic diagram of a multi-touch system for controlling liquid crystal capacitors to reduce touch sensing interferences according to the invention.

FIG. 6 is a schematic diagram of a multi-touch system 600 according to a preferred embodiment of the invention. In FIG. 6, the system 600 includes a touch LCD panel 610 and a touch display control subsystem 620.

The touch LCD panel 610 has a thin film transistor (TFT) layer 611, a sensing electrode layer 613, and a common voltage layer (Vcom) 615 formed in a stacking manner. The stacking manner can be the TFT layer 611 at the bottom, the common voltage layer (Vcom) 615 in the middle, and the sensing electrode layer 613 at the top of the touch LCD panel 610.

The TFT layer 611 has K gate driving lines (G1-G600) and L source driving lines (SOURCE1-SOURCE800) in order to drive display transistors Tr and capacitors $C_{LC}$ corresponding to pixels on the LCD panel, according to a display pixel signal and a display driving signal, for performing a display driving, where K, L are each a positive integer. For convenient description, in this embodiment, we have K=600, and L=800.

In this embodiment, the active element in the TFT layer 611 is a TFT. Alternatively, in other embodiments, it can be a low temperature polysilicon (LTPS) TFT, indium gallium zinc oxide (IGZO) TFT, or continuous grain silicon (CGS).

The sensing electrode layer 613 has M sense conductive lines (RX1-RX12) in order to sense an approaching external object according to a touch driving signal, where M is a positive integer. In this embodiment, we have M=12.

The common voltage layer (Vcom) 615 has N common voltage conductive lines (Vcom1-Vcom20) in order to receive a common voltage Vcom on displaying and the touch driving signal on touch sensing, where N is a positive integer, and K>N. In this embodiment, we have N=20.

Each intersection of the sense conductive lines (RX1-RX12) in the sensing electrode layer 613 and the common voltage conductive lines (Vcom1-Vcom20) is implemented with a sensing electrode area 601 connected to the corresponding sense conductive line (RX1, RX2, ... , RX12). The sensing electrode area 601 has a shape of diamond, square, rectangular, or round.

Each of the sense conductive lines (RX1-RX12) is connected to N sensing electrode areas 601. The M×N (12×20) sensing electrode areas 601 are divided into N groups (20 groups), each of N groups corresponding to a different common voltage conductive line. In this embodiment, when a touch sensing is performed, the touch display control subsystem 520 provides the touch driving signal to an i-th common voltage conductive line (Vcomi) for saving the cost. In other embodiments, a touch driving layer can be implemented alone, and multiple touch driving conductive lines can be implemented in the touch driving layer. The touch display control subsystem 520 can provide the touch driving signal to the common voltage conductive lines, and M sense conductive lines can sense whether an external object approaches or not.

For saving the cost, the sense conductive lines (RX1-RX12) and sensing electrode areas 601 of the sensing electrode layer 613 can be designed in the TFT (or LTPS) layer 611.

The touch display control subsystem 620 is connected to the TFT layer 611 and the common voltage layer (Vcom) 615 in order to provide the display driving signal to the K gate driving lines (G1-G600) sequentially for activating the corresponding display transistors and to provide the display pixel signal to the L source driving lines (SOURCE1-SOURCE800) for performing a display driving. Namely, the voltage of the display pixel signal is outputted to the corresponding liquid crystal capacitor. For example, if a pixel is displayed in 8 bits, the touch display control subsystem 620 can write the voltage corresponding to 0-255 through the display transistor in the liquid crystal capacitor $C_{LC}$. The touch display control subsystem 620 provides the touch driving signal to the N common voltage conductive lines sequentially and samples sensing voltages of the M sense conductive lines to thereby detect whether an external object approaches or not.

The K (600) gate driving lines are divided into N (20) groups. Each group of gate driving lines corresponds to a common voltage conductive line (Vcom). When the touch display control subsystem 620 provides the display driving signal to an i-th group of gate driving lines, a display driving is performed, and the liquid crystal capacitor corresponding to the i-th group is set to a predetermined voltage, where i=1 to N. Then, the touch display control subsystem 620 provides the touch driving signal to an i-th common voltage conductive line in order to perform a touch sensing by the M sense conductive lines (RX1-RX12), where i=1 to N.

Figure 7A:
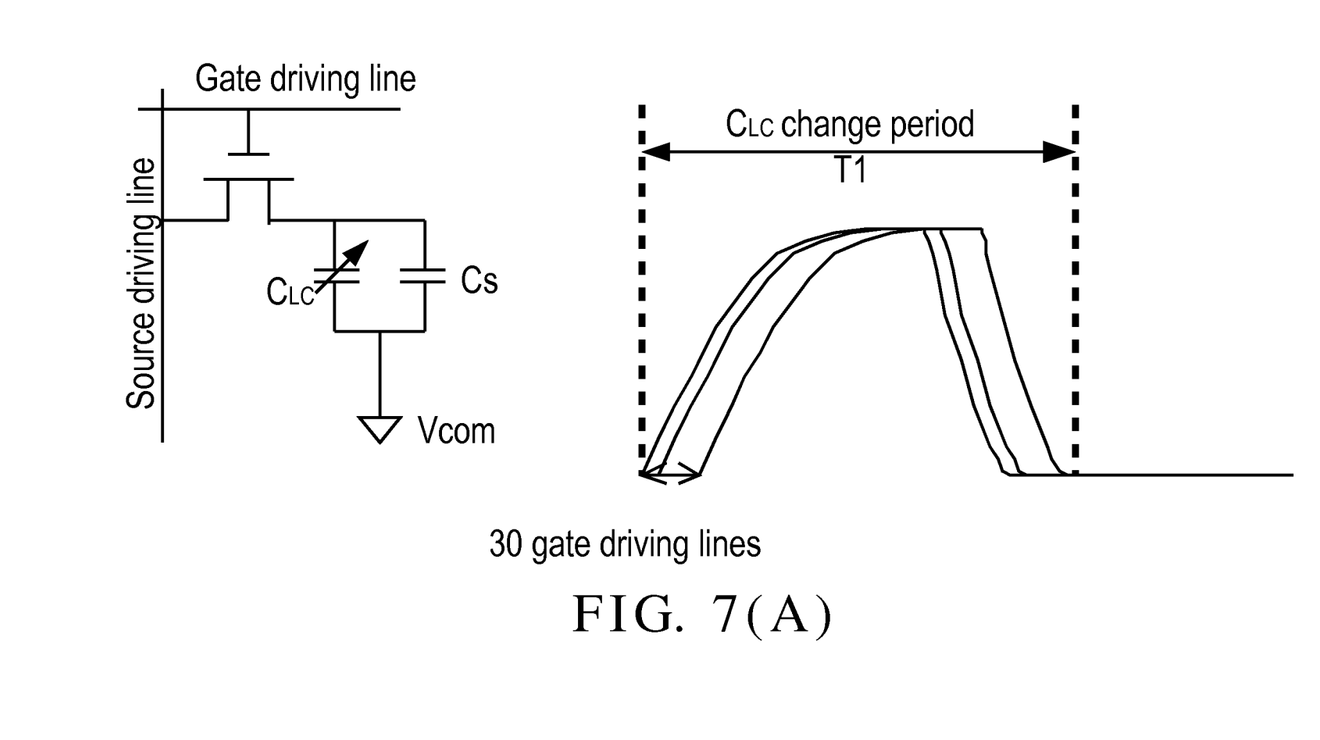
FIGS. 7(A) and 7(B) schematically illustrate display and touch detection performed by a multi-touch system according to the invention.
Figure 7B:
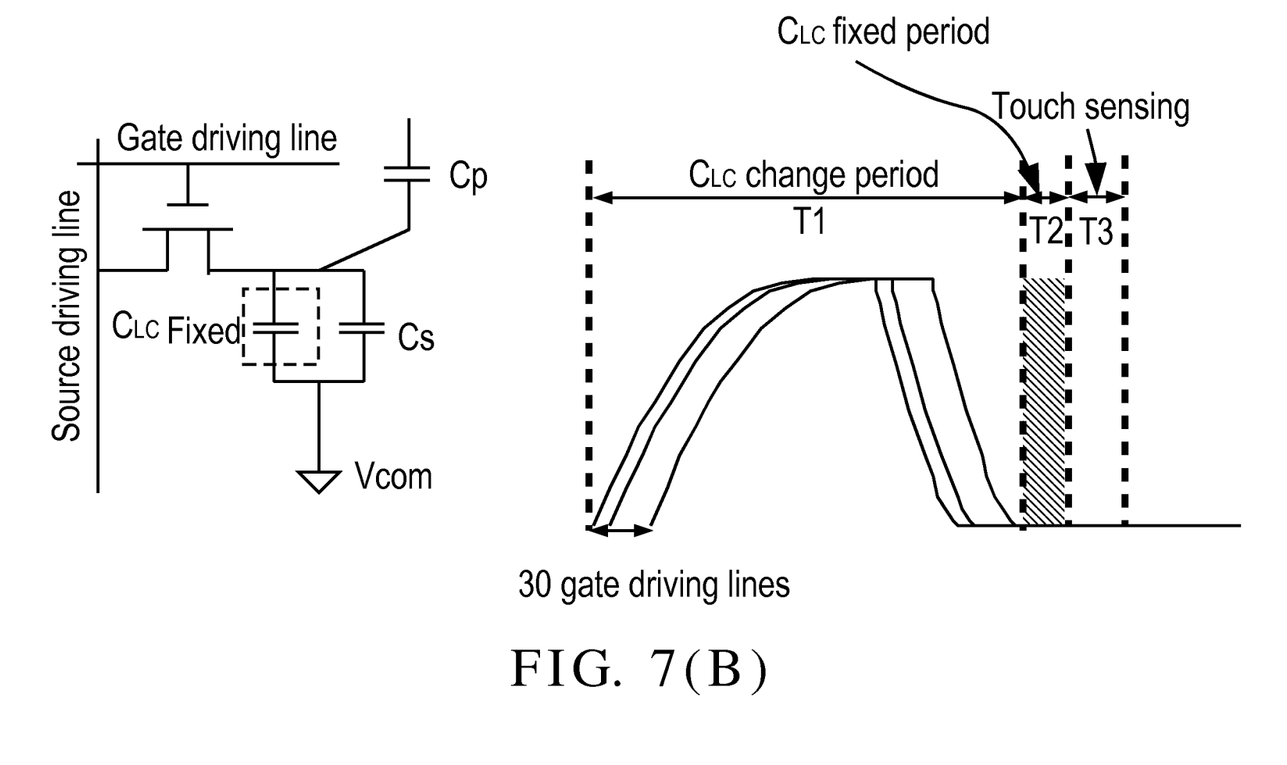

FIGS. 7(A) and 7(B) are schematic diagrams of display and touch detection performed by a multi-touch system according to the invention. The multi-touch system in this case is an in-cell multi-touch LCD panel system. As shown in FIG. 7(A), when a display is performed at first time interval T1, the touch display control subsystem 620 first provides the display driving signal to the first group of gate driving lines (G1-G30). Then, the touch display control subsystem 620 provides the display pixel signal to the liquid crystal capacitors $C_{LC}$ corresponding to the first group of gate driving lines (G1-G30). Voltages of the liquid crystal capacitors $C_{LC}$ are set by the corresponding pixel values of the display pixel signal. In this case, due to the different pixel values, the liquid crystal capacitors $C_{LC}$ corresponding to the gate driving lines (G1, G2, . . . , G30) are not the same, which is in a change period. When the display driving is performed, the common voltage conductive line Vcom1 corresponding to the first group of gate driving lines (G1, G2, . . . , G30) is connected to a common voltage Vcom.

At second time interval T2, the touch display control subsystem 620 sets all the liquid crystal capacitors $C_{LC}$ corresponding to the first group of gate driving lines to a predetermined voltage. Namely, when a pixel is in an 8-bit representation, the predetermined voltage is a maximum voltage corresponding to the maximum value of 255 capable of being set for the liquid crystal capacitors $C_{LC}$. That is, all the voltages of the liquid crystal capacitors $C_{LC}$ are set to the maximum voltage corresponding to the maximum value of 255. Alternatively, the predetermined voltage can be a minimum voltage corresponding to the minimum value capable of being set for the liquid crystal capacitor $C_{LC}$.

At third time interval T3, when providing the display driving signal to the i-th group of gate driving lines, the touch display control subsystem 620 provides the touch driving signal to the (i–1)-th common voltage conductive line, where i=2 to N. Namely, the touch display control subsystem 620 provides the display driving signal to the second group (G31, G32, . . . , G60), and also provides the touch driving signal to the first common voltage conductive line Vcom1 in order to perform a touch sensing by the M sense conductive lines. Accordingly, when the touch sensing is performed, the voltage of the liquid crystal capacitor $C_{LC}$ is fixed to reduce the change affection of the liquid crystal capacitor $C_{LC}$ in touching detection.

For improving the affection of the liquid crystal capacitor $C_{LC}$ in touching detection, the prior art adds an insulating sheet or air gap between the touch panel and the LCD panel to thereby increase the driving voltage and eliminate the panel noises, which at the same increases the panel thickness and the power consumption. By contrast, the invention uses the scheme of controlling the liquid crystal capacitor $C_{LC}$.

Figure 8:
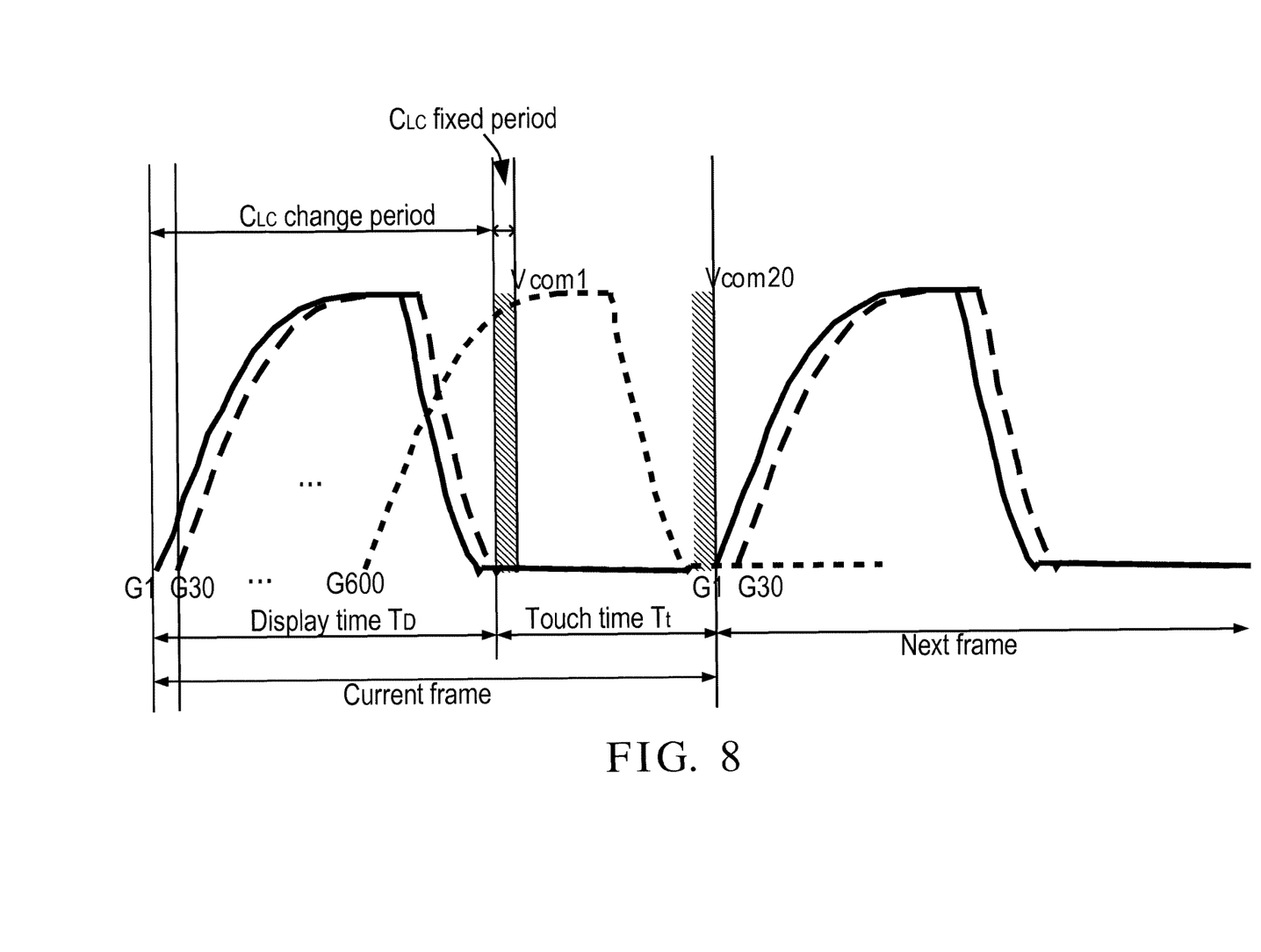
FIG. 8 is another schematic diagram of display and touch detection performed by a multi-touch system according to the invention.

FIG. 8 is another schematic diagram of display and touch detection performed by a multi-touch system according to the invention. The multi-touch system in this case is a multi-touch LCD panel system. A flowchart of display and touch for one frame is shown in FIG. 8. It is noted that the control signal of the gate driving lines for the capacitance value of the liquid crystal capacitor $C_{LC}$ is separate in the fixed period and the change period. Namely, when the i-th group of gate driving lines performs a display driving, the voltage of the liquid crystal capacitor $C_{LC}$ corresponding to the i-th group cannot be set at the same time.

Accordingly, the display pixel signal corresponds to multiple frames, wherein each frame contains a display time and a touch time. During the display time, the capacitance of the liquid crystal capacitor is changeable to thereby write the display pixel signal in the liquid crystal capacitor for performing a display driving. During the touch time, the capacitance of the liquid crystal capacitor is fixed to thereby reduce the noises in touch detection.

In addition, ratio of the display time TD to the touch time Tt can be arranged arbitrarily. The scanning time of one frame is determined by the display time TD and touch time Tt. Thus, upon the scanning change and touch scanning rate of the display panel, the capacitive touch detection is performed with the above operations, so that the affection of the liquid crystal capacitor $C_{LC}$ can be prevented.

Figure 9:
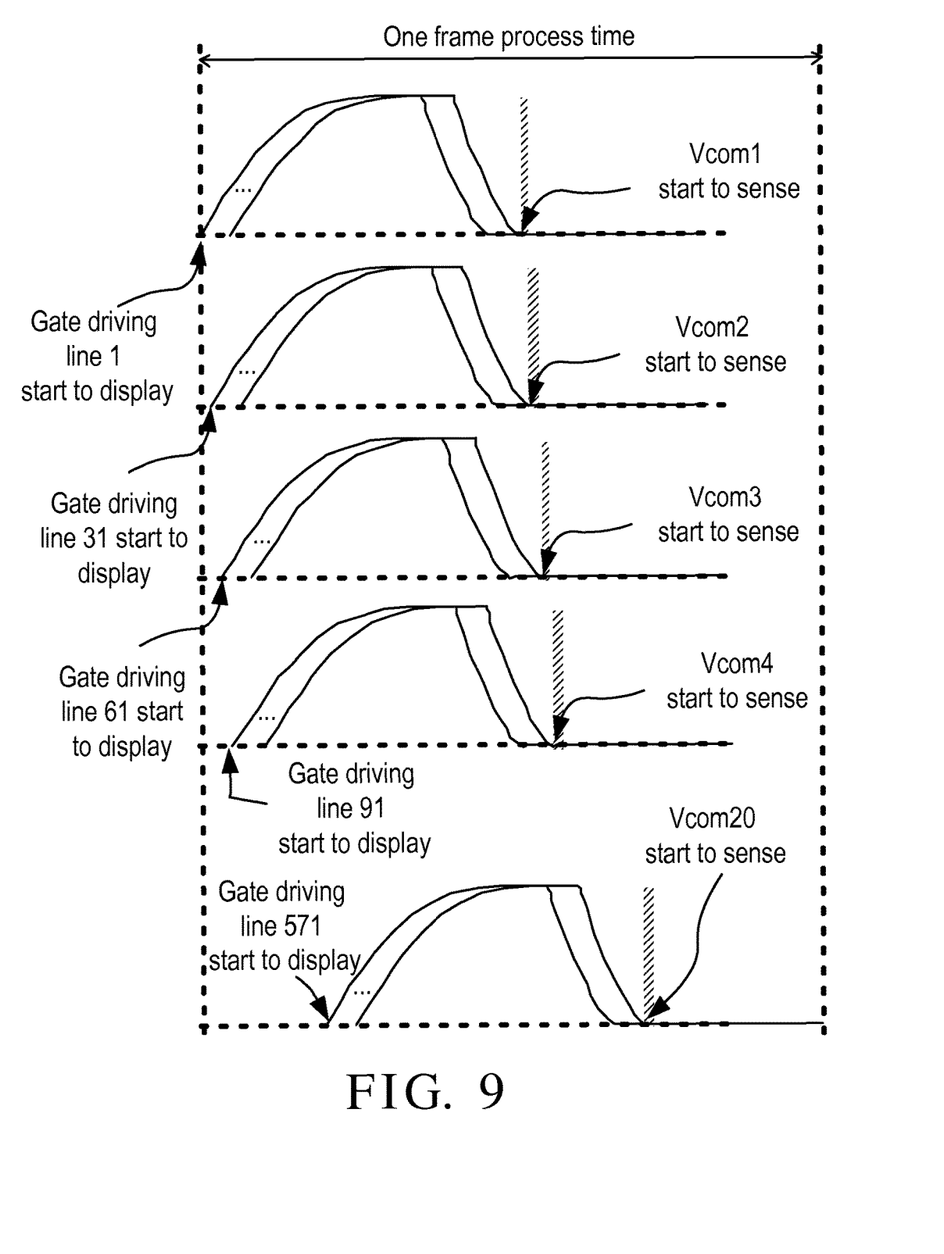
FIG. 9 is another schematic diagram of FIG. 8 according to the invention.

FIG. 9 is another schematic diagram of FIG. 8 according to the invention. As shown in FIG. 9, when the capacitance of the liquid crystal capacitor $C_{LC}$ corresponding to the i-th group of gate driving lines is no longer changed, the i-th common voltage conductive line begins to detect a touch.

The liquid crystal capacitor $C_{LC}$ is not necessarily changed to be a constant. When the liquid crystal capacitor $C_{LC}$ is steady, it remains at a certain value ranging from 0 to 255. In this embodiment, a value of 255 is given as an example, and control of the liquid crystal capacitor can be achieved by controlling the voltage, but not limited to it.

Figure 10:
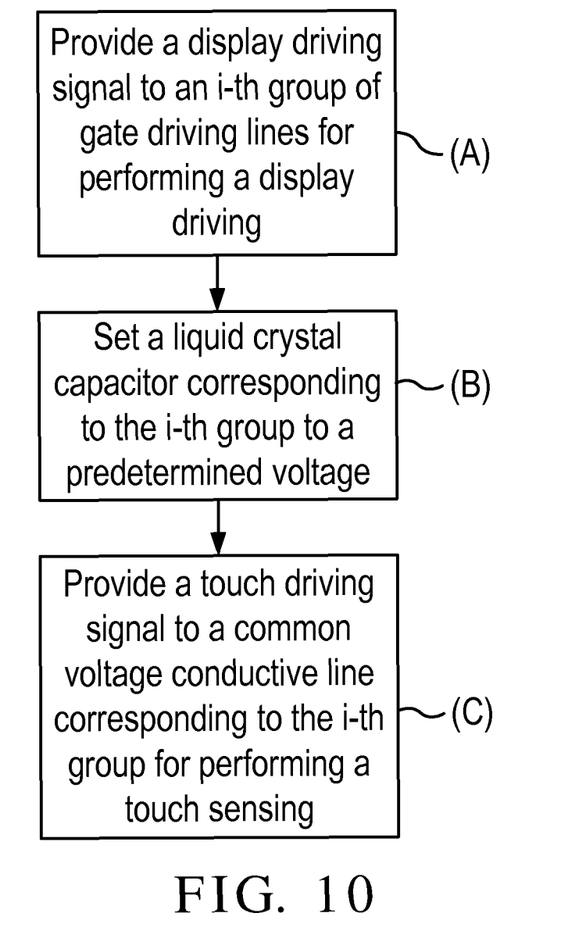
FIG. 10 is a flowchart of a method for controlling liquid crystal capacitors to reduce touch sensing interferences in a multi-touch system according to the invention.

FIG. 10 is a flowchart of a method for controlling liquid crystal capacitors to reduce touch sensing interferences from an LCD in a multi-touch system. The method can reduce the noise interference of the display panel in touch detection. The multi-touch system 600 has K gate driving lines (G1, G2, . . . , G600) divided into N groups (20 groups), each corresponding to a common voltage conductive line (Vcomi). As shown in FIG. 10, at step (A), the touch display control subsystem 620 provides a display driving signal to an i-th group of gate driving lines for performing a display driving, where i=1 to N. When the display driving is performed, the i-th common voltage conducive line corresponding to the i-th group of gate driving lines is connected to a common voltage (Vcom).

At step (B), the touch display control subsystem 620 sets the liquid crystal capacitor $C_{LC}$ corresponding to the i-th group to a predetermined voltage. For example, the predetermined voltage can be a maximum or a minimum voltage corresponding to the maximum value capable of being set for the liquid crystal capacitor $C_{LC}$.

At step (C), the touch display control subsystem 620 provides a touch driving signal to the i-th common voltage conductive line corresponding to the i-th group for performing a touch sensing. When the touch sensing is performed, the voltage of the liquid crystal capacitor $C_{LC}$ is fixed. When the display driving signal is provided to the i-th group of gate driving lines, the touch driving signal is provided to the (i–1)-th common voltage conductive line, where i=2 to N.

In short, step (A) is performed in a display time of a current frame, and steps (B) and (C) are performed in a touch time of the current frame.

As cited, it is known that, in a normal display operation, the liquid crystal capacitor $C_{LC}$ is varied with the frame, and the touch detection or sensing is not performed during the normal display operation. When a group of gate driving lines for one frame is scanned completely, the liquid crystal capacitor $C_{LC}$ corresponding to the group of gate driving lines is set to reach a steady state. When the liquid crystal capacitor $C_{LC}$ is steadily fixed at a value, the touch detection starts, and the sensing range is on the common voltage conductive line corresponding to the group of gate driving lines. The aforementioned operations continue until the last common voltage conductive line is complete, which is regarded as the end of one frame detection. Accordingly, the operations are repeated for the other frames.

In view of the foregoing, the touch sensing is performed and not affected by the change of the liquid crystal capacitor $C_{LC}$ by controlling the liquid crystal capacitor $C_{LC}$. As compared with the prior art, the TFT LCD panel and the touch detection are concurrently performed. Since the liquid crystal capacitor $C_{LC}$ may affect the capacitance change to further cause a wrong decision in touch detection, the invention can control the change of the liquid crystal capacitor $C_{LC}$ to thereby reduce the touch sensing affection from the noises produced by the LCD panel, so that the touch detection can be more stable Although the present invention has been explained in relation to its preferred embodiment, it is to be understood that many other possible modifications and variations can be made without departing from the spirit and scope of the invention as hereinafter claimed.

What is claimed is:

1. A multi-touch system for controlling liquid crystal capacitors to reduce touch sensing interferences, comprising:
   a touch LCD panel including:
   a thin film transistor (TFT) layer, having K gate driving lines and L source driving lines for driving corresponding display transistors and liquid crystal capacitors according to a display pixel signal and a display driving signal so as to perform a display driving;
   a common voltage layer, which is arranged on the TFT layer and has N common voltage conductive lines for receiving a common voltage on displaying;
   a sensing electrode layer, which is arranged on the common voltage layer and has M sense conductive lines, for sensing whether an external object approaches or not while the common voltage conductive line transmits a touch driving signal; and
   a touch display control subsystem, connected to the TFT layer and the common voltage layer, for providing the display driving signal to the K gate driving lines sequentially to activate the corresponding display transistors and providing the display pixel signal to the L source driving lines to perform the display driving, and further providing the touch driving signal to the N common voltage conductive lines sequentially and sampling sensing voltages of the M sense conductive lines to detect whether the external object approaches or not, where K, L, M, N are positive integer respectively;
   wherein the K gate driving lines are divided into N groups and each group of gate driving lines corresponds to a common voltage conductive line, and when the touch display control subsystem provides the display driving signal to an i-th group of gate driving lines for performing the display driving at a first time interval T1, said liquid crystal capacitors corresponding to the i-th group are set to a predetermined voltage at a second time interval T2, and the touch display control subsystem provides the touch driving signal to an i-th common voltage conductive line for performing a touch sensing by the M sense conductive lines at a third time interval T3, where i=1 to N.

2. The multi-touch system as claimed in claim 1, wherein the predetermined voltage of the liquid crystal capacitor is fixed when the touch sensing is performed.

3. The multi-touch system as claimed in claim 2, wherein the common voltage conductive line corresponding to the liquid crystal capacitor is connected to the common voltage when the display driving is performed.

4. The multi-touch system as claimed in claim 3, wherein the predetermined voltage is a maximum voltage capable of being set for the liquid crystal capacitor.

5. The multi-touch system as claimed in claim 4, wherein each intersection of the M sense conductive lines in the sensing electrode layer and the N common voltage conductive lines is implemented with a sensing electrode area connected to a corresponding sense conductive line.

6. The multi-touch system as claimed in claim 5, wherein the touch display control subsystem provides the touch driving signal to a (j−1)-th common voltage conductive line when the display driving signal is provided to a j-th group of gate driving lines, where j=2 to N.

7. The multi-touch system as claimed in claim 6, wherein the display pixel signal corresponds to multiple frames including a display time and a touch time respectively, wherein the liquid crystal capacitor is adjustable during the display time and the liquid crystal capacitor is fixed during the touch time.

8. The multi-touch system as claimed in claim 3, wherein the predetermined voltage is a minimum voltage capable of being set for the liquid crystal capacitor.

9. The multi-touch system as claimed in claim 1, wherein the K gate driving lines and the N common voltage conductive lines are implemented in a first direction, and the L source driving lines and the M sense conductive lines are implemented in a second direction, when the first direction is vertical to the second direction.

10. A method for controlling liquid crystal capacitors to reduce touch sensing interferences in a multi-touch system, the multi-touch system having a sensing electrode layer which has M sense conductive lines for sensing whether an external object approaches or not, the multi-touch system having a common voltage layer which has N common voltage conductive lines for receiving a common voltage on displaying, the sensing electrode layer being arranged on the common voltage layer, the multi-touch system having K gate driving lines divided into N groups, each group of gate driving lines corresponding to a common voltage conductive line, where M, K, N are each a positive integer, the method comprising the steps of:
   (A) providing a display driving signal to an i-th group of the gate driving lines and providing a display pixel signal to the liquid crystal capacitors corresponding to the i-th group of the gate driving lines for performing display driving at a first time interval T1, where i=1 to N;
   (B) setting all the liquid crystal capacitors corresponding to the i-th group of the gate driving lines to a predetermined voltage at a second time interval T2; and
   (C) providing a touch driving signal to an i-th common voltage conductive line corresponding to the i-th group of the gate driving lines for performing touch sensing at a third time interval T3.

11. The method as claimed in claim 10, wherein voltages of the liquid crystal capacitors are set by corresponding pixel values of the display pixel signal at the first time interval.

12. The method as claimed in claim 10, wherein a voltage of the liquid crystal capacitor is fixed when the touch sensing is performed.

13. The method as claimed in claim 10, wherein an i-th common voltage conductive line corresponding to the i-th group of the gate driving lines is connected to a common voltage when the display driving is performed.

14. The method as claimed in claim 13, wherein the predetermined voltage is a maximum voltage capable of being set for the liquid crystal capacitor.

15. The method as claimed in claim 14, wherein the touch driving signal is provided to a (j−1)-th common voltage conductive line when the display driving signal is provided to a j-th group of gate driving lines, where j=2 to N.

16. The method as claimed in claim 13, wherein the predetermined voltage is a minimum voltage capable of being set for the liquid crystal capacitor.

17. The method as claimed in claim 10, wherein the display pixel signal correspond to multiple frames including a display time and a touch time respectively, and step (A) is performed during the display time, or steps (B) and (C) are performed during the touch time.

\* \* \* \* \*